United States Patent [19]
Little, Jr.

[11] Patent Number: 4,879,651
[45] Date of Patent: Nov. 7, 1989

[54] GAME POINT SCORING AND ANALYZING DEVICE

[76] Inventor: Robert E. Little, Jr., G-5 Harbour West Condominiums, Rocky Mount, N.C. 27801

[21] Appl. No.: 293,536

[22] Filed: Jan. 5, 1989

Related U.S. Application Data

[63] Continuation of Ser. No. 851,215, Apr. 14, 1986, abandoned.

[51] Int. Cl.⁴ .................. G06F 15/44; G08B 23/00
[52] U.S. Cl. .................. 364/411; 364/410; 273/1 ES; 273/183 R; 273/162 A
[58] Field of Search .............. 364/410, 411; 273/176 A, 180 A, 183 R, 32 R, 1 ES, 162 A

[56] References Cited

U.S. PATENT DOCUMENTS

| | | | |
|---|---|---|---|
| 4,097,855 | 6/1978 | Salvo | 340/323 R |
| 4,130,871 | 12/1981 | Olsen et al. | 377/5 |
| 4,142,236 | 2/1979 | Marty | 364/411 |
| 4,220,992 | 9/1980 | Blood et al. | 364/410 |
| 4,237,372 | 12/1980 | Zeogolis et al. | 235/92 GA |
| 4,245,216 | 1/1981 | Rintoul | 340/323 R |
| 4,286,323 | 8/1981 | Meday | 377/5 |
| 4,367,526 | 1/1983 | McGeary | 364/410 |

FOREIGN PATENT DOCUMENTS

| | | | |
|---|---|---|---|
| 2711796 | 9/1978 | Fed. Rep. of Germany | 377/5 |
| 1604843 | 5/1978 | United Kingdom | 377/5 |

Primary Examiner—Jerry Smith
Assistant Examiner—Kim Thanh Tbui
Attorney, Agent, or Firm—Dowell & Dowell

[57] ABSTRACT

A device resembling a miniature calculator to be worn either on the wrist by a player, or hand-carried by another person, the device having two elongated multiple-digit displays, one for catagorizing and listing points won by the user and the type of shot on which the win was based, and the other for categorizing and listing points lost to the opponent and the type of shots on which the loss was based. The device has a point-WON button and a point-LOST button, which serve to determine which of the two displays will be receiving a point to be newly entered, and the device has a number of additional buttons serving to categorize the type of shot resulting in a won or a lost point. The device can be reset manually, and also has gates which establish a required sequence for pressing the buttons which sequence prevents any accidental double entry of a score either by pressing a button twice or by the bounce of a button's electrical keyboard switch.

9 Claims, 2 Drawing Sheets

GAME POINT SCORING AND ANALYZING DEVICE

This application is a continuation of application Ser. No. 851,215, filed Apr. 15, 1986 now abandoned.

BACKGROUND AND PRIOR ART

This invention relates to a device in the nature of a small electronic calculator which can be hand carried by a coach or can be worn on the wrist of a player, and which is used to record won and lost game points, while at the same time providing a continuously visible readout showing categories representing multiple types of shots that have resulted in winning and losing points, and showing the number of shots entered in each shot category.

A player participating in a highly competitive match, such as racquetball, tennis, etc., in order to improve his or her play, needs to be provided with an analysis that will indicate the player's own strengths and weaknesses when faced with a certain opponent, and also strengths and weaknesses displayed by that opponent. This is true not only during the match, but is also true after the match has concluded so that the player can be informed of areas of play requiring special concentration and practice in order to improve skills for subsequent matches. A scoring and analyzing device capable of providing such information can be either worn by the player and incremented after each point is won or lost, or it can be used by a third person coaching the player and serving during subsequent analyzing of both players' performances. When worn and incremented by the player during the match, the device must be easy to use, and must provide continuous displays of all of the recorded categories in order to be of any practical assistance to the player during the match.

No such device is available at the present time, although many scoring devices have been patented.

The only disclosure of a game scoring device known at the time of this writing which seeks to analyze the players' performances shot-wise is U.S. Pat. No. 4,220,992 to Blood et al, which shows a golf scoring device which the inventor recognises could be adapted for use in other games such as tennis. This patent shows a rather large manual device having a keyboard designed to enter the scores for different players and having means for entering the types of shots hit by the players during the course of the match, i.e. whether a golf shot was long or short, hooked, straight or sliced, topped, etc. However, although this device would be useful to a player participating in a golf match at a fairly leisurely pace, it would be useless in providing advice to a player wearing the device during a spirited racquetball or tennis match, since in the Blood device there is only one readout which must be switched around to cause it to display the different information retained in the device's memories. Moreover, since the Blood device is electronically very complex and costly to manufacture, it would require a relatively high sales price.

U.S. Pat. Nos. 4,097,855 to Salvo, and 4,237,372 to Zevgolis et al, show tennis score keeping devices having multiple readouts, but these readouts are not associated with various types of shots used by the players in making or losing points. The readouts show only total scores for games, sets and matches. The golf scoring U.S. Pat. Nos. 4,142,236 to Martz, and 4,367,526 to McGeary, also show multiple readouts, but not in conjunction with analysis of different types of shots made by the individual players.

A cribbage scoring device shown in U.S. Pat. No. 4,245,216 to Rintoul shows score keeping for two players, with readouts for each and means to enter a score in the correct player's readout, but it shows no analysis of performance.

What is needed is a device which will show with statistical and categorical certainty an analysis of the way that points were scored by both the player himself and his opponent, so as to permit the user of the device to know with objective certainty the types of shots used by both players and the degrees of success with which such shots were made, whereby to avoid reliance on ones own subjective memory to analyze in detail how the match was won or lost.

THE INVENTION

The device resembles a miniature calculator, and can be either worn on the wrist by a player, or hand-carried by a person observing and/or coaching a player during a match. It has two elongated multiple-digit display screens, one for categorizing and listing points won by the wearer, and the other for categorizing and listing points lost to the wearer's opponent. Two of the push buttons on the device, a point WON button and a point LOST button, serve to determine which of the two display screens will be receiving a point to be newly entered, i.e. depending on whether the wearer won or lost the point. A number of additional buttons serve to categorize the type of shot resulting in a won or a lost point. Buttons of the latter type are referred to as "shot" buttons, and each defines a different type of shot, such as a ceiling shot, a lob shot, a smash shot, a pinch shot, etc. Most of these shot buttons appear in pairs, indicating whether the shot was to the right or left. For example, a button marked CR represents a ceiling shot to the right, and a botton marked CL represents a ceiling shot made to the left of the user of the device. When a particular shot is to be recorded, the player first presses either the WON or the LOST button, depending on whether he won or lost the last point, and then presses whichever one of the shot buttons most accurately describes the type of shot resulting in a won or lost point. The pressing of these two buttons results in incrementing the count in the window or screen segment corresponding with the shot button, and located in either the upper or the lower elongated display screen which was selected by the pressed WON or LOST button. Electronically, corresponding with each screen segment which is capable of displaying a number, there is a digital counter serving as a memory for that window and driving a seven segment decoder for that window. The shot buttons are each capable of incrementing the count in either of two counters, which respectively control the displays in the two windows corresponding with that type of shot. Gate circuits select which of the two counters will be incremented by the pressing of a shot button, and these gate circuits are in turn enabled by whichever of the WON or LOST buttons is pressed. Thus two buttons must be pressed for each incrementing of a count, and this tends to provide safety against accidental spurious incrementing of any count. In the illustrated embodiment for racquetball, there are thirteen windows in each elongated screen readout, and there are thirteen shot keys to select from in addition to the WON and LOST keys. The device can be modified to score and analyze shots for other games, for instance tennis, handball, squash, golf, etc., and in such modifications different numbers of windows and shot keys can be used as may be appropriate. An on/off button allows also for resetting of all of the counters to zero. A Velcro wrist band can be easily adjusted to support the device on the wearer's wrist, and can be washed after each match.

OBJECTS AND ADVANTAGES OF THE INVENTION

It is a principal object of the invention to provide a point scoring and analyzing device for recording the type of shots made by both players during competition, while categorizing the winning or losing shots according to type, whereby to permit analysis by the wearer of the performance of both players in response to the hitting and returning of various different types of shots during the progress of the match as well as during subsequent study of the players' techniques. Such information shows which types of serves as well as other shots made by one player were most effective against the other player, and just how many shots of each type were used during the match by each player.

It is another major object of the invention to provide a device which continuously and simultaneously displays all of the different categories of shots together with the points won and the points lost as a result of the shots, whereby at all times the information is available for immediate use by the wearer of the device while his match is actually in progress without his having to press any further buttons or switch displays to retrieve it. This instant display allows the player to capitalize on his opponent's weaknesses and his own strengths by planning his attack and defense strategies while there is still time to profit from the planning. Objective information appearing in the windows of the device will be much more reliable that the player's own subjective interpretation of remembered events blurred by the distractions of play.

A further object of the invention is to provide a device which displays "unforced" errors of the players which can also be entered into appropriate counters.

Another important object of the invention is to provide a scoring device having multiple gates which are interconnected in such a way as to establish a required sequence for pressing of the buttons, which sequence requires first the pressing of a point-won, or a point-lost button, followed by the pressing of a shot button. Since the pressing of a point button can only be followed in the sequence by the pressing of a shot button, and since the pressing of a shot button automatically resets the sequence to require the initial pressing of a won or lost button, it follows that the accidental double pressing of any button, or bounce of a button's contacts, can not confuse the sequence or make additional false entries.

It is a still further object of the invention to provide a device resembling a small calculator which is operated by a self contained battery whose life is maximized by the use of CMOS electronic components, and LCD displays which draw only miniscule current. Moreover, the device can be cemented to a Velcro pad which can be removably attached to a Velcro wrist band which is easily adjusted for a tight fit, and which can be removed for washing. Although this invention is illustrated by an embodiment that shows a digital form of display, it is to be understood that other types of displays may be employed, for instance hystogram bargraph types of representations.

Other objects and advantages of the invention will become apparent during the following discussion of the drawings.

DESCRIPTION OF PREFERRED EMBODIMENTS OF THE INVENTION

Figure 1:
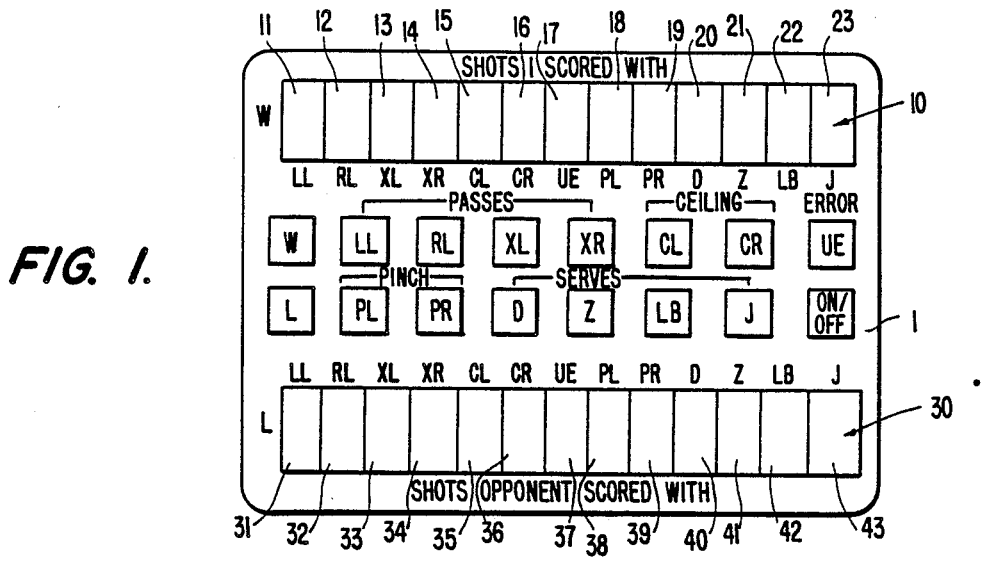
FIG. 1 is a plan view of a racquetball point scoring and analyzing device made according to this invention.
Figure 2:
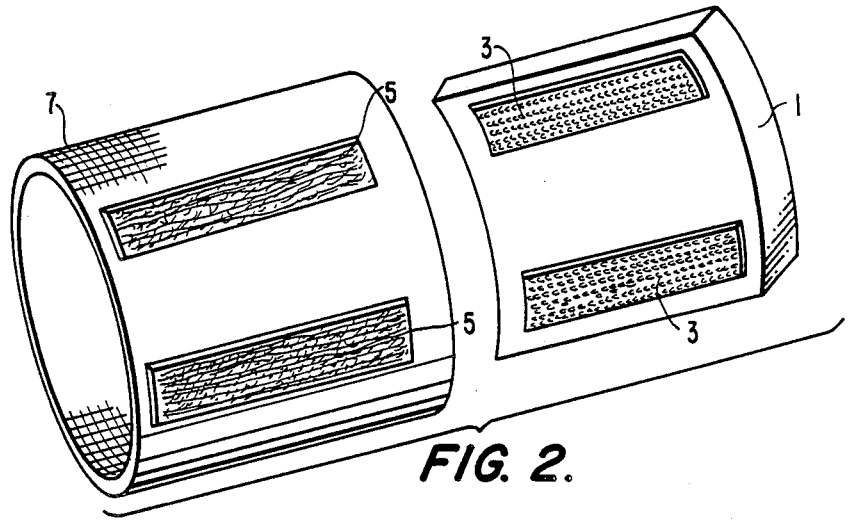
FIG. 2 is a perspective exploded view showing a wrist band and a device according to this invention fitted with Velcro strips so that the bottom of the device can be detachably applied to the wrist band.

Referring now to FIG. 1, this figure shows a scoring and analyzing device according to the invention, the device being mounted in a case 1 which may be curved to fit more snuggly on the wrist of a wearer, the bottom of such a curved case being shown in FIG. 2 fitted with one or more securing means, in the illustrative embodiment comprising Velcro strips 3 for mating with complementary Velcro strips 5 sewn on an athletic wrist band 7 shaped to tightly grip the wearer's wrist In cases where the device is not intended to be worn on a wrist, the case 1 can be made rectangular without curvature.

The top surface of the case 1 carries multiple push buttons of several different types. These buttons include an ON/OFF button for selectively connecting an internal battery B to the electronic circuit, as discussed hereinafter. In addition, there are two buttons marked W and L which are the point WON and point LOST buttons by which the wearer indicates to the device whether the point being entered is one which was won or lost as a result of the type of shot being recorded in a selected category. Finally, there are multiple "shot" buttons, thirteen in FIG. 1, which are used by the wearer to categorize the type of shot which resulted in the won or lost point. In FIG. 1, the embodiment is intended especially for recording racquetball points, and the shot buttons are marked as follows to signify various types of shots:

LL refers to a passing shot hit down the left side wall;
RL refers to a passing shot hit down the right side wall;
XR a cross-court shot hit to the right side of the court;
XL a cross-court shot hit to the left side of the court;
PL a pinch shot hit to the left side of the court;
PR a pinch shot hit to the right side of the court;
CR a ceiling ball rebounding toward the right rear corner;
CL a ceiling ball rebounding toward the left rear corner;
D a drive served to one of the rear corners;
Z a Z-shot served to one of the rear corners;
LB a lob served to one of the back corners;
J a jam serve hit directly toward the opponent; and
UE an unforced error on the part of one of the players.

These thirteen buttons extending across the middle of the device are used to increment the count in two elongated digital display screens 10 and 30, each screen having thirteen windows that are respectively identified by the numerals 11 through 23, and 31 through 43 in which the number of recorded shots are dispayed. These windows are marked with adjacent letter symbols that are the same as the shot button markings listed in the preceding paragraph. The buttons, their markings and their numbers are illustrative of the invention, and are not intended to limit the types of shots which can be categorized and recorded according to this invention.

During the course of a competitive match, the player who is wearing the device will, after each point is scored by either player, decide what type of shot resulted in scoring of that point, i.e. which of the 13 categories most nearly defined the nature of the shot. Having thus characterized the shot, he will press either the W button if he won the point or the L button if he lost the point, and the pressing of one of these two buttons will select which display screen will be incremented, i.e. the upper screen or the lower screen. Having pressed the appropriate W or L button, the player will then press whichever of the shot buttons he has selected as best characterizing the nature of the scoring shot, i.e. a ceiling shot, a lob shot, a pinch shot, etc. If the player has pressed the W botton and then the CL button, the number in the window 15 of the upper screen 10 will be incremented. If he has pressed the L button first, then the subsequent pressing of the CL button will increment the window 35 of the lower screen 30. Since all numbers are continuously displayed until the power is turned off using the ON/OFF button, the wearer can at any time during the match see at a glance where his weaknesses and strengths lie, and, likewise where those of his opponent lie, and can be prepared to mount better offensive and defensive strategies. Moreover, after the match is concluded, the wearer can study the information in greater detail at his leisure.

Figure 3:
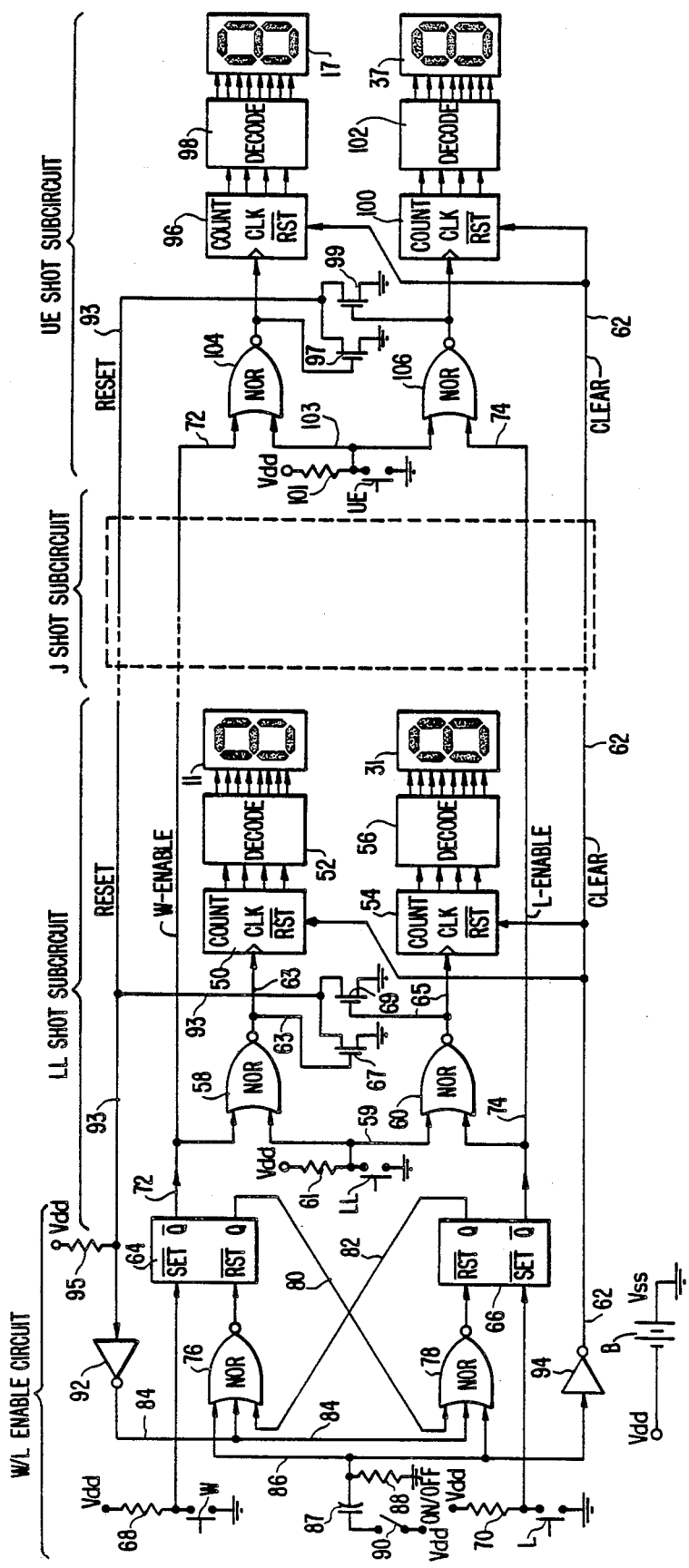
FIG. 3 is a schematic diagram of circuitry suitable for use in the present device for entering, storing and displaying score points according to the types of shots and to whether the play resulted in a won or lost point for the wearer.

Referring now to FIG. 3, this diagram shows typical circuitry for implementing the present invention. Since there are thirteen shot buttons, each for catagorizing a different type of shot as shown in FIG. 1, there are thirteen subcircuits which count the shots, and one WON/LOST enable circuit which determines which of the upper and lower displays will contain a shot being entered. In FIG. 3, the first circuit from the left is the W/L enable circuit. The next is the first shot subcircuit, marked LL shot subcircuit since it controls the display which totals the number of passing shots hit down the left side wall. This subcircuit includes two display windows which are respectively the windows referenced 11 and 31 in FIG. 1. In order to avoid confusing duplication of the numerous other shot subcircuits, only two more are shown in FIG. 3, the J subcircuit representing the jam shot counters being shown merely as a box in dashed lines, and the last subcircuit to the right representing the UE shot subcircuit which counts the number of unforced errors of the players. All of the thirteen shot subcircuits are identical in circuitry. They each include two display windows which correspond with the windows shown in FIG. 1. In the UE subcircuit, the windows are referenced 17 and 37. Each of the subcircuits includes two decade counters, two decoders and two display windows. A determination of which counter is incremented is made by the W/L enable circuit that will be described herein after the shot subcircuits have been described.

In FIG. 3 the LL shot subcircuit, as labeled at the top of the figure, comprises an upper decade counter 50 which drives a decade decoder 52 which in turn drives a seven segment numerical display window 11. This is the counter and display for points won. Similarly, the LL subcircuit includes a decade counter 54 driving a decade decoder 56 which in turn drives a seven segment display window 31, for points lost. The decade counters are incremented when their clock terminals are changed from a high to a low level by outputs from NOR gates 58 and 60 whose output terminals normally remain low in this circuitry. The counters 50 and 54 are reset to zero when a low appears on the clear line 62 in a manner to be presently described.

Still referring to FIG. 3, the W/L enable circuit at the left end of the diagram determines which of the displays 11 or 31 will be incremented, i.e. the upper WON display, or the lower LOST display. This is achieved by pressing either the W button or the L button at the left of the diagram. There are two flipflops 64 and 66 in the W/L enable circuit, each of which has two outputs. When these flipflops are reset, the complemented outputs which go to the W enable line 72 and the L enable line 74 are high and the other outputs are low. The flipflops are reset to this condition by applying a low to their reset terminals. Conversely, when set, the outputs reverse their high and low states. Most of the time the flipflops are in reset condition. The set terminals of the flipflops are normally held high by input through resistors 68 and 70 which are returned to the positive supply voltage Vdd. However, when the button W is pressed, for example, the input to the set terminal of the flipflop 64 goes low and the outputs are toggled so that the W enable line 72 goes low. Likewise, pressing of the L button will drive the set terminal of the flipflop 66 low and will toggle its outputs so that the L enable line 74 will go low. When the W enable line 72 goes low, it enables one input terminal of each of the upper NOR gates of all thirteen of the shot subcircuits, such as the upper terminals of the gates 58 and 104. Similarly, when the L enable line 74 goes low it enables one terminal of each of the thirteen lower gates, such as the lower terminals of the gates 60 and 106. The other terminals of these shot subcircuit gates will be enabled whenever the associated shot button is pushed. For instance, in the LL subcircuit, the button LL enables the other terminals of the NOR gates 58 and 60 when it is pressed. The line 59 is normally held high by the resistor 61 which is returned to the positive Vdd source, but pressing of the button LL places a low signal on line 59 to enable the attached NOR gate terminals. Note that, as will be presently seen, only one of the W or L enable lines 72 or 74 can be enabled (low) at any time. Therefore if the button LL is pressed only one of the outputs of the gates 58 or 60 will be driven high. Since these are NOR gates, and since their outputs to the decade counter clock terminals are low whenever either one of their inputs is high, and since all of their inputs are normally high, their outputs remain normally low until both of their inputs are driven low.

Assuming that both flipflops 64 and 66 are presently reset so that the enable lines 72 and 74 are high, now if for example the wearer of the device wishes to record a point won by him as a result of a left side shot, he will first depress the W button, which will toggle the flipflop 64 to provide a low on the W enable line 72 to enable the upper input of the NOR gate 58. He will then depress the LL button to lower the line 59. The gate 58 will place a low on the line 63. As soon as he releases the LL button, the line 63 will immediately go high again and this transition from low to high will increment the decade counter 50, increasing by one the count in the display 11. If he had wished to record a lost point, the wearer would first have pressed the L button which would have toggled the flipflop 66 to provide an enabling low on the L enable line 74 to enable the lower input of the gate 60, so that when he subsequently pressed the LL botton, the NOR gate 60 would have provided a high on its output 65, which upon release of the LL button would have incremented the clock terminal of the decade counter 54 to increase by one the number displayed in the window 31.

In each shot subcircuit, there are two transistors such as the transistors 67 and 69, which achieve automatic resetting of the W/L enable circuit after a score has been entered by the wearer. For instance, if the W enable flipflop 64 has been toggled to lower the W enable line 72, then when the LL button is pressed the line 63 will go high, the transistor 67 will become conductive to lower the voltage level on the reset line 93, which is otherwise maintained high by the resistor 95 connected to Vdd. The lowering of the line 93 causes a high to appear on the line 84 through the inverter 92, thereby placing a high on the center inputs to the NOR gates 76 and 78, whereby to lower their outputs to the reset terminals of both flipflops 64 and 66. Since the latter is still reset, only the former is toggled back again to reset condition. In addition, the cross-connecting lines 80 and 82 ensure that only one flipflow can be set at any moment in time. For example, when the flipflop 64 is set, the output from its lower terminal on line 80 places a high on the upper input to NOR gate 78 to provide a low at its output to force resetting of the flipflop 66 if for some reason it were not already reset. Likewise, whenever the flipflop 66 is set by the button L, a high on its upper output to line 82 will maintain the flipflop 64 reset through the lower input to the NOR gate 76. As a result it is impossible for both the W enable line 72 and the L enable line 74 to be enabled by a low at the same time. The other shot subcircuits have similar reset transistors, such as the transistors 97 and 99 which also enable the reset line 93 to reset the W/L enable circuit each time the UE shot button is pressed and released.

Finally, when the wearer has finished with the device and wishes to clear all the decade counters and window displays, he can open the ON/OFF switch. When it is opened, the resistor 88 lowers the level on line 86. Then when the user again closes the ON/OFF switch to use the device to tally another match, a pulse of voltage is applied to the line 86 through the capacitor 87, momentarily raising the voltage on the input to the inverter 94 and causing its normally high output on clear line 62 to go low. This lowering of the voltage on the line 62 has the effect of resetting all the decade counters such as the counters 50, 54, 96 and 100, whereby the window displays all show zero count. As soon as the pulse through the capacitor 87 dissipates and line 86 goes low, the voltage on the clear line 62 goes high again and incrementing of the counters by pressing of appropriate buttons can proceed. Power to supply the circuitry is provided by a battery B furnishing the positive operating potential Vdd, the negative terminal Vss being connected to a common circuitboard ground.

The UE shot subcircuit shown to the right in FIG. 3 is used to record unforced errors by which points are won or lost, and operates similarly to the LL shot subcircuit. One input to one of the NOR gates 104 or 106 is enabled by either the W enable line 72 or the L enable line 74, and the other input to the enabled NOR gate is enabled by pressing the button UE to draw down the level of the line 103, whereby the output of one of the NOR gates will go high. When the button UE is released, the corresponding one of the decade counters 96 or 100 will have its clock terminal go from a high to a low state, whereby that counter will be incremented and will drive the attached decoder 98 or 102 to show an increase of one in the corresponding display window 17 or 37.

Figure 4:
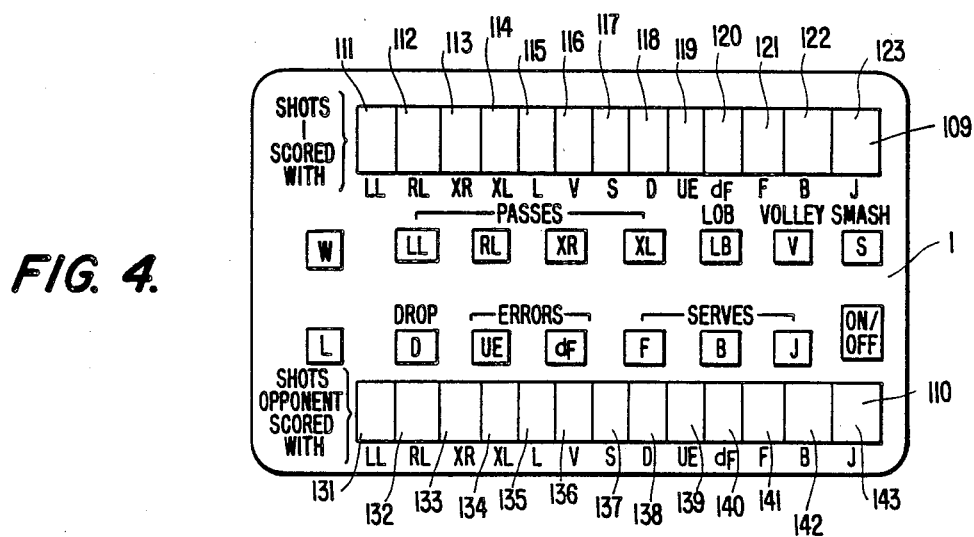
FIG. 4 is a plan view similar to FIG. 1, but showing a tennis point scoring device.

Referring now to FIG. 4, this figure shows a device for scoring and analyzing points won and lost during a tennis match. It is modified from the showing of FIG. 1 since it is intended for use to score a different game. However, its top surface also carries multiple push buttons of different types. These buttons also include an ON/OFF button for selectively connecting an internal battery B to the electronic circuit, as discussed in connection with FIG. 3. In addition, there are two buttons marked W and L which are point WON and point LOST buttons which function similarly to those shown in FIGS. 1 and 3, and by which the wearer indicates to the device whether the point being entered is one which was won or lost as a result of the type of shot being recorded in a selected category. Finally, there are multiple "shot" buttons, also thirteen in number, which are used by the wearer to categorize the type of tennis shot which resulted in the won or lost point. In FIG. 4 the shot buttons are marked as follows to signify various types of shots:

LL refers to a passing shot hit down the left line;
RL refers to a passing shot hit down the right line;
XR a cross-court shot hit to the right corner of the court;
XL a cross-court shot hit to the left corner of the court;
LB a lob shot hit deep to the back of oppponent's court;
V a volley shot hit from a point near the net;
S an overhead smash shot after a opponent's lob;
D a drop shot;
DF a double fault;
F a winning service to opponent's forehand;
B a winning service to opponent's backhand;
J a jam serve hit directly toward the opponent; and
UE an unforced error on the part of one of the players.

These thirteen buttons extending across the middle of the device are used to increment the count in two elongated digital display screens 109 and 110, each screen having thirteen windows that are respectively identified by the numerals 111 through 123, and 131 through 143 in which the number of recorded shots are dispayed. As in the case with FIG. 1, these windows are marked with letters adjacent thereto corresponding with the letter markings on the push buttons themselves. More or fewer buttons can of course be used to adapt the device for the scoring of different types of events.

There is no reason why the windows of the device should be limited to single digit displays. The numbers counted therein can easily be increased to double digits or to include a "1" to the left of the seven segment display which can be lighted when the device is counted beyond "9". There are several inexpensive and well known techniques for accomplishing such a purpose where the anticipated score may exceed "9".

After the match is completed, the wearer can tabulate the numbers in the displays, for instance onto a paper cards printed to simulate the face of the present scoring device, whereupon the device can be cleared in preparation for the next match.

This invention is not to be limited to the exact embodiments of the present disclosure, for obviously change can be made therein within the scope of the following claims.

I claim:

1. A game point scoring and analyzing device for tabulating and displaying for a plurality of different shot categories the number of shots in each category which resulted in game points won and lost by an individual during a game, comprising:

(a) an electronic circuit mounted within a portable display case of a size to be worn on the individual's wrist, means for providing power to the electronic circuit through an ON/OFF switch, said electronic circuit including first and second electronic counters and first and second numerical displays for each shot category, said first numerical displays representing points won by the individual and said second numerical displays representing points lost by the individual, each of said electronic counters having a clock terminal for increasing a count and having a counter reset terminal for resetting the counter to zero;

(b) first and second counter control gates connected to said first and second electronic counters, respectively, each of said counter control gates having first and second inputs and an output connected to said clock terminal of the associated electronic counter and operates in response to said first and second inputs being enabled to increment the associated electronic counter;

(c) a point-won and a point-lost enable circuit, said point-won enable circuit including input terminal means and output terminal means, said output terminal means of said point-won enable circuit being connected to said first inputs of said first counter gate for each of said first electronic counters, said point-lost enabling circuit including input terminal means and output terminal means, said output terminal means of said point-lost enable circuit being connected to said first input of said second counter gate for each of said second electronic counters;

(d) a point-won button means operative when actuated to enable said input terminal of said point-won enable circuit, and a point-lost button means operative when actuated to enable said input terminal of said point-lost enable circuit;

(e) a plurality of shot button means, one for each different shot category, each shot button means being connected to said second inputs of both said first and second counter gates in each different shot category, and each shot button means being manually operable to enable said second inputs of said first and second counter gates; and (f) and gate means coupled with said first and second counter control gates for each different shot category and said point-won and point-lost enable circuits, and operative to establish a required sequence which requires the pressing of said point-won or said point-lost button means prior to the pressing of a shot button means in order to increment a count in any of said first and second electronic counters;

(g) said input terminal means of said point-won and point-lost enable circuits respectively, include a point-won flipflop and a point-lost flipflop, each flipflop including a set and a reset terminal, said gate means including first and second enable circuit gates, said first enable circuit gate having an output coupled to the reset terminal of said point-won flipflop and having an input connected to said first counter control gates, said second enable circuit gate having an output coupled to the reset terminal of said point-lost flipflop and having an input connected to said second counter control gates, said first and second enable circuits being operative to reset both flipflops whenever any of said first or second counter control gates increments an electronic counter, (h) said first and second enable circuit gates have second inputs, said second input of said first enable circuit gate being connected to an output of said point-lost flipflop and said second input of said second enable circuit gate being connected to an output of said point-won flipflop, said second inputs of said first and second enable circuit gates being operative to deliver outputs to reset one flipflop when the other flipflop is set, whereby the information regarding points won and lost in each of the plurality of different shot categories is readily available for immediate use by the individual while a game is in progress.

2. A scoring and analyzing device as claimed in claim 1, wherein said device is powered by a battery through an ON/OFF switch, and wherein said enable circuit gates have third inputs coupled with said ON/OFF switch and operative upon actuation of the switch to deliver from said outputs of said enable circuit gates to reset both flipflops.

3. A scoring and analyzing device as claimed in claim 1, wherein the numerical displays of the plurality of different shot categories are arranged in two rows of windows across said display case, one row of windows and displays representing said points won and the other row representing said points lost.

4. A scoring and analyzing device as claimed in claim 3, wherein the shot buttons are marked with indicia indicating the categories of shots that they respectively represent, and wherein the windows corresponding with the various shot buttons are marked with similar indicia.

5. A scoring and analyzing device as claimed in claim 1, wherein the display case has a front face through which said first and second numerical displays are viewable and having a rear face supporting a securing means; and a wrist band for gripping the individual's wrist, said wrist band having means for releasably engaging said securing means to support said display case on the individual's wrist, said wrist band being separable from said display case for washing.

6. A portable game point scoring and analyzing device for tabulating and displaying for a plurality of different shot categories the number of shots in each category which resulted in game points won and lost by an individual during a game, comprising:

(a) an electronic circuit mounted within a portable display case of a size to be worn on the individual's wrist, said electronic circuit including a plurality of first and second electronic counters which are connected to a plurality of first and second numerical displays, each of the different shot categories being reflected by one of said first and second numerical displays, said first numerical displays representing points won by the individual within the different shot categories and said second numerical displays representing points lost by the individual within the different shot categories, each of said electronic counters having a clock terminal for incrementing a count and having a counter reset terminal for resetting the counter to zero;

(b) Power means for energizing said electronic circuit through an ON/OFF switch, said first and second numerical displays being continuously energized by said power means when said ON/OFF switch is in an ON position so that said first and second numerical displays of each of the different shot categories are continuously and simultaneously displayed to reflect all counts entered into each of said first and second electronic counters so that information regarding points won and points lost in each of the plurality of different shot categories is continuously available for immediate use by the individual when a game is in progress.

(c) first and second counter control gates connected to said first and second electronic counters, respectively, each of said counter control gates having first and second inputs and an output connected to said clock terminal of the associated electronic counter and operative in response to said first and second inputs being enabled to increment the associated electronic counter;

(d) a point-won and a point-lost enable circuit, said point-won enable circuit including input terminal means and output terminal means, said output terminal means of said point-won enable circuit being connected to said first inputs of said first counter gate for each of said first electronic counters, said point-lost enabling circuit including input terminal means and output terminal means, said output terminal means of said point-lost enable circuit being connected to said first input of said second counter gate for each of said second electronic counters;

(e) a point-won button means operative when actuated to enable said input terminal of said point-won enable circuit, and a point-lost button means operative when actuated to enable said input terminal of said point-lost enable circuit;

(f) a plurality of shut button means, one for each different shot category, each shot button means being connected to said second inputs of both said first and second counter gates in each different shot category, and each shot button means being manually operable to enable said second inputs of said first and second counter gates; and (g) gate means coupled with said first and second counter control gates for each different shot category and said point-won and point-lost enable circuits, and operative to establish a required sequence which requires the pressing of said point-won or said point-lost button means prior to the pressing of a shot button means in order to increment a count in any of said first and second electronic counters.

7. A scoring and analyzing device as claimed in claim 6, wherein the numerical displays of the plurality of different shot categories are arranged in two rows of windows across said display case, one row of windows and displays representing said points won and the other row representing said points lost.

8. A scoring and analyzing device as claimed in claim 6, wherein the display case has a front face through which said first and second numerical displays are viewable and having a rear face supporting a securing means; and a wrist band for gripping the individual's wrist, said wrist band having means for releasably engaging said securing means to support said display case on the individual's wrist, said wrist band being separable from said display case for washing.

9. A scoring and analyzing device as claimed in claim 8, wherein the shot buttons are marked with indicia indicating the categories of shots that they respectively represent, and wherein the windows corresponding with the various shot buttons are marked with similar indicia.

* * * * *